United States Patent [19]

Gallagher et al.

[11] Patent Number: 5,525,377
[45] Date of Patent: Jun. 11, 1996

[54] METHOD OF MANUFACTURING ENCAPSULATED DOPED PARTICLES

[75] Inventors: Dennis Gallagher, Stamford, Conn.; Rameshwar Bhargava; Jacqueline Racz, both of Ossining, N.Y.

[73] Assignee: U.S. Philips Corporation, New York, N.Y.

[21] Appl. No.: 488,310

[22] Filed: Jun. 7, 1995

Related U.S. Application Data

[62] Division of Ser. No. 318,034, Oct. 14, 1994, which is a continuation of Ser. No. 51,118, Apr. 21, 1993, abandoned.

[51] Int. Cl.[6] ................................................. C08J 7/04
[52] U.S. Cl. .......................... 427/512; 427/216; 427/221; 427/388.1; 427/435; 427/443.2; 427/558; 427/581
[58] Field of Search ................................. 427/512, 558, 427/581, 216, 221, 388.1, 435, 443.2

Primary Examiner—Bernard Pianalto
Attorney, Agent, or Firm—Michael E. Schmitt

[57] ABSTRACT

Doped encapsulated semiconductor nanoparticles of a size (<100 Å) which exhibit quantum effects. The nanoparticles are precipitated and coated with a surfactant by precipitation in an organometallic reaction. The luminescence of the particles may be increased by a further UV curing step.

20 Claims, 3 Drawing Sheets

METHOD OF MANUFACTURING ENCAPSULATED DOPED PARTICLES

This is a division of application Ser. No. 08/318,034, filed Oct. 14, 1994, which is a continuation of Ser. No. 08/051,118, filed Apr. 21, 1993, abandoned.

BACKGROUND AND SUMMARY OF THE INVENTION

This invention relates to semiconductor materials and particularly to encapsulated quantum sized doped semiconductor materials and methodology for manufacturing these particles by precipitation. These particles may be described as doped nanocrystals (i.e. crystallites of less than 100 Å) which exhibit quantum effects.

This application is related to application Ser. No. 08/050,693 entitled "Method of Manufacturing Quantum Sized Doped Semiconductor Particles" filed Apr. 20, 1993 which is directed to a heterogeneous process for manufacturing nanoparticles within a polymer matrix and the disclosure of which is hereby incorporated by reference.

By making semiconductor particles small enough to show quantum confinement effects and doping them with a luminescent activator element, new optical properties are created which differ from those of chemically identical bulk material and from the quantum confined host material alone. An activator doped and quantum confined host material was made which demonstrates a blue shift (shorter wavelengths) in the excitation wavelengths of the activator. These systems also display a dramatic decrease ($>10^5$) in the time for luminescence decay with an efficiency and brightness comparable to bulk ZnS:Mn phosphors. These new material characteristics indicate a fundamental change in the optical properties which results from the quantum confinement. Other methods to produce this material and other unique properties, such as reduced excitation voltages for flat panel cathode ray tubes, are also possible.

It has been recognized that when the radius of a semiconductor crystallite is near that of the Bohr radius of the exciton, there is a quantum size effect and its electronic properties change (Y. Wang and N. Herron, "Nanometer-Sized Semiconductor Clusters: Materials Synthesis, Quantum Size Effects and Photophysical Properties", J. Phys. Chem. 95 525, 1991). This had been observed as a blue shift (shift to shorter wavelengths) in the optical bandgap for quantum sized ZnS particles in solution (H. Weller, U. Koch, M. Guitierrez and A. Henglein, "Photochemistry of Colloidal Metal Sulfides. Absorption and Fluorescence of Extremely Small ZnS Particles (The World of Neglected Dimensions)", Ber. Bunsenges. Phys. Chem. 88 649, 1984). Most of the II–VI and some III–V and group IV semiconductors have been prepared as quantum sized particles and demonstrate quantum size effects in their physical properties. The size at which the particles demonstrate changes in their bandgap from the quantum size effects vary with the intrinsic electronic structure of the compound but typically appear when below 100 Å in diameter. To exhibit quantum size effects it is also necessary for the particles to remain isolated from one another, if allowed to aggregate the material exhibits bulk properties despite the small size of the individual particles.

Quantum confinement effects were first described with semiconductors prepared by precipitation. The precipitation of particles from chemical solutions is induced either by the creation of a new phase in a chemical reaction or by the supersaturation of a soluble phase. This is the most basic of materials processing techniques. To control the nuclei size on the basis of thermodynamics, one is balancing the free energy decrease from the formation of the lower energy phase vs. the increase in free energy from the new surface formed. To make the precipitation nuclei small, one must choose a chemical system where the decrease in free energy from forming the new phase is large —i.e. a highly reactive chemistry, the precipitation product should have a low solubility in the solvent, and the reaction should be spontaneous to limit diffusional growth of the particles after nucleation. Chemistry is not the only issue, physical conditions like concentration of reactants also affects the nuclei number density and thus controls the agglomeration and the growth of particles after precipitation.

Most homogeneous precipitation of nanometer sized undoped particles has used an aqueous salt chemistry (e.g. $Zn(ClO_4)+NaHS \rightarrow ZnS$ in water). The present methodology uses an organometallic chemistry in a hydrocarbon solvent. See, e.g., Johnson et al (C. E. Johnson, D. K. Hickey, and D. C. Harris, "Synthesis of Metal Sulfide Powders From Organometallics," Mat. Res. Soc. Symp. Proc. Vol 73,785–789, 1986) wherein 0.1 µm undoped ZnS particles (not quantum sized) were produced in organic solvents. The attraction of this chemistry is that the powders are highly crystalline and had very low residual organic content (<60 ppm alkane). In the present development, by controlling the physical process parameters, a similar chemistry can be used to make quantum sized particles (<50 Å). However the particles must also be doped.

The doping of semiconductor powders with a manganese is usually accomplished by the thermal diffusion of Mn from a salt or carbonate at 1100° C. Thermal diffusion is impractical for nanometer sized particles because they melt and sinter at extremely low temperatures (e.g. 18 Å CdS particles melt at 200° C. vs 1403° C. in the bulk material). Physical and morphological changes at elevated temperatures will ruin the quantum confinement characteristics of this system. Thus the material must be doped during the particle formation by a chemical process.

The manganese ion is large and multivalent and reacts readily to form new compounds in solution —this makes incorporating Mn during ZnS precipitation difficult. To solubilize the metal in an organic solvent it is necessary to use an organic chelating ligand, but most Mn organometallics are unstable and either polymerize or precipitate a separate Mn inorganic phase which precludes the doping of ZnS. The present work utilizes the formation of a metastable intermediate organometallic compound which is compatible with the present ZnS forming reaction to provide the Mn. This is the first known use of a chemical doping process in the precipitation of nanometer sized ZnS particles.

The reaction to form the manganese organometallic is a synthesis technique known as a Grignard reaction which uses an organomagnesium halide in an exchange reaction with a metal salt. The reaction used herein is:

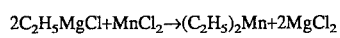

$$2C_2H_5MgCl + MnCl_2 \rightarrow (C_2H_5)_2Mn + 2MgCl_2$$

with tetrahydrofuran as a solvent. There are many other possible Grignard reaction chemistries that will provide a manganese organometallic. Since most manganese reaction products are unstable, they must be used immediately in the ZnS synthesis reaction to provide the desired Mn.

To maintain the separation for quantum confinement in precipitated particles, it is also necessary to add a material which coats the surface of the particles and provides a barrier to agglomeration. These molecules are commonly referred to as surface active agents—surfactants. The requirements of a surfactant for the present system are straightforward:

1. must be soluble in hydrocarbon solvents
2. must not participate in the chemical reactions to dope or form the ZnS
3. must have an ultraviolet absorption below the absorption edge of the host matrix (e.g. ZnS). This requirement may be ignored for long wavelength or non-optical applications.

It is the ultraviolet absorbance which excludes most known surfactants, nevertheless it is believed that there are many molecules which could suffice. The surfactant used in this development was poly(methyl methacrylate) (PMMA) and its monomer, methacrylic acid. PMMA has been studied as a surfactant and has demonstrated both physical adsorption (thermodynamic driven) and chemical adsorption (hydrogen bonding with C=O group in polymer) onto oxide surfaces.

The nanocrystals (doped particles <100 Å) produced by the present invention have a luminescent efficiency which is high for films prepared at room temperature. Normally, bulk ZnS:Mn used in electroluminescent devices yield high efficiency when prepared above temperatures of 350° C. For powder phosphors, this temperature is frequently as high as 1000° C. The new doped nanocrystals also emit light significantly faster (shorter luminescent decay time) than that observed with corresponding bulk material. This faster luminescent decay time in a nanocrystal provides advantage over bulk material for application where speed is important, i.e. faster phosphors for next generation TV's and displays.

Possible applications for new materials based on the concepts and materials described in this application include:

Luminescent phosphors for use in cathode ray tubes and lights.

Thin films for electroluminescent displays.

Lasing phosphors.

The use of luminescent activators and magnetic particles for magneto-optical recording and displays.

Lower voltage phosphors for flat cathode ray tubes.

Markers for medical diagnosis.

DETAILED DESCRIPTION OF THE PREFERRED EMBODIMENTS

Figure 1:
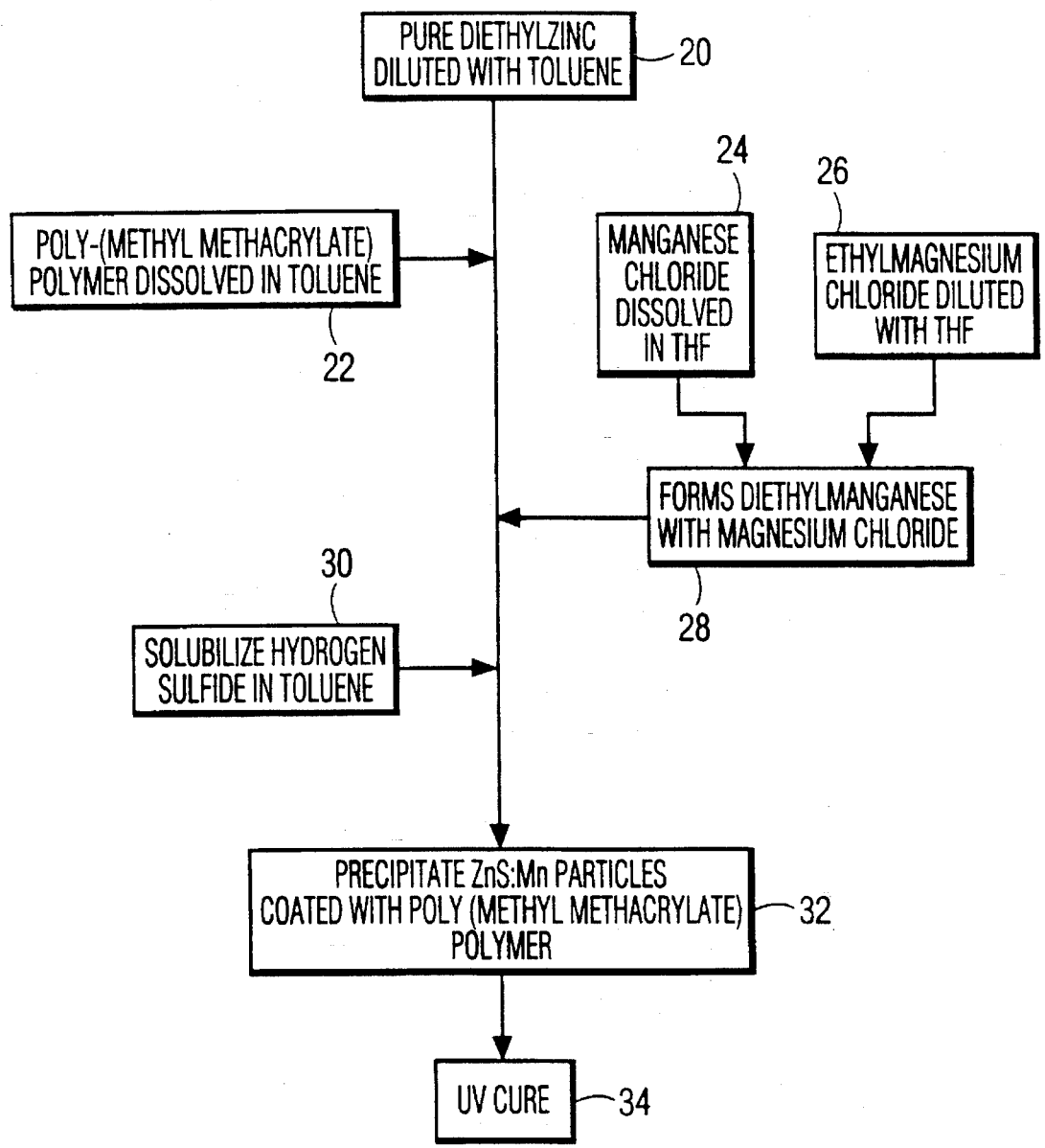
FIG. 1 is a flow chart of the process for manufacturing encapsulated doped semiconductor nanoparticles in accordance with the present invention.

A flowchart of the process is presented in FIG. 1. The starting solution at step 20 contains pure diethylzinc $((C_2H_5)_2Zn$, CAS number [557-20-0]) dissolved in toluene (Anhydrous, $C_6H_5CH_3$, CAS no. [108-88-3]) so that the final reaction concentration of zinc is $5 \times 10^{-3}$M. The diethylzinc can also be obtained by a Grignard reaction. The surfactant, poly(methyl methacrylate) (medium molecular weight powder, approximately 145,000), $[H_2C=C(CH_3)(COOCH_3)]_n$, CAS no. [9011-14-7](0.28 g dissolved in 20 ml toluene)), is added to the diethylzinc solution at step 22. It takes approximately 12–18 hours for the PMMA to dissolve.

Separately, the diethylmanganese was prepared by the Grignard reaction of 1.3 ml of manganese chloride ($MnCl_2$, CAS no. [7773-01-5](0.122 g dissolved in 17 ml tetrahydrofuran at step 24)) (anhydrous, $C_4H_8O$, CAS no. [109-99-9]) with 10 ml of ethylmagnesium chloride (2.0M solution in tetrahydrofuran, $C_2H_5MgCl$, CAS no. [2386-64-3], (diluted 1:100 in tetrahydrofuran at step 26)). This amount of manganese would correspond to approximately 10 atomic % if all manganese chloride was converted to diethylmanganese and all was incorporated in the ZnS. A stoichiometric excess of ethylmagnesium chloride is used to drive the reaction at step 28 to completion. The reaction product is orange in color but turns brown with time as the diethylmanganese decomposes.

In another separate reaction at step 30, hydrogen sulfide gas ($H_2S$, gas, CAS no. [7783-06-4]) is bubbled through 23.72 ml of toluene for approximately 5 minutes and then stopped, this time is considered sufficient for the room temperature equilibrium concentration of hydrogen sulfide to be solubilized (approximately $6.32 \times 10^{-4}$ moles/ml at 20°C.). This provides a final concentration of sulfur to the reaction of $1 \times 10^{-1}$M. Note that $H_2S$ should not be bubbled into the reaction as bubbling $H_2S$ directly into the reaction would cause non-quantum-sized particles to form on the bubbles at the gas/liquid interface. The precipitation occurred instantaneously at step 32 when after the addition of the diethylmanganese solution to the previous solution of diethylzinc and PMMA, the solubilized hydrogen sulfide was also added at step 30. The reaction is in evidence first by the observation of evolved gases (probably ethylene) from a bubbler attached to the reactor, and second by the change in the solution from transparent to translucent, a result of particle agglomeration into floccs large enough to scatter light. The precipitated particles are quantum sized (<100 Å) ZnS:Mn coated with PMMA with a dopant concentration of 0.5–1.0%. After the precipitation the particles may be washed in any solvent suitable to remove reaction byproducts from the particles. At step 34 the encapsulated particles are cured by UV exposure.

Figure 2:
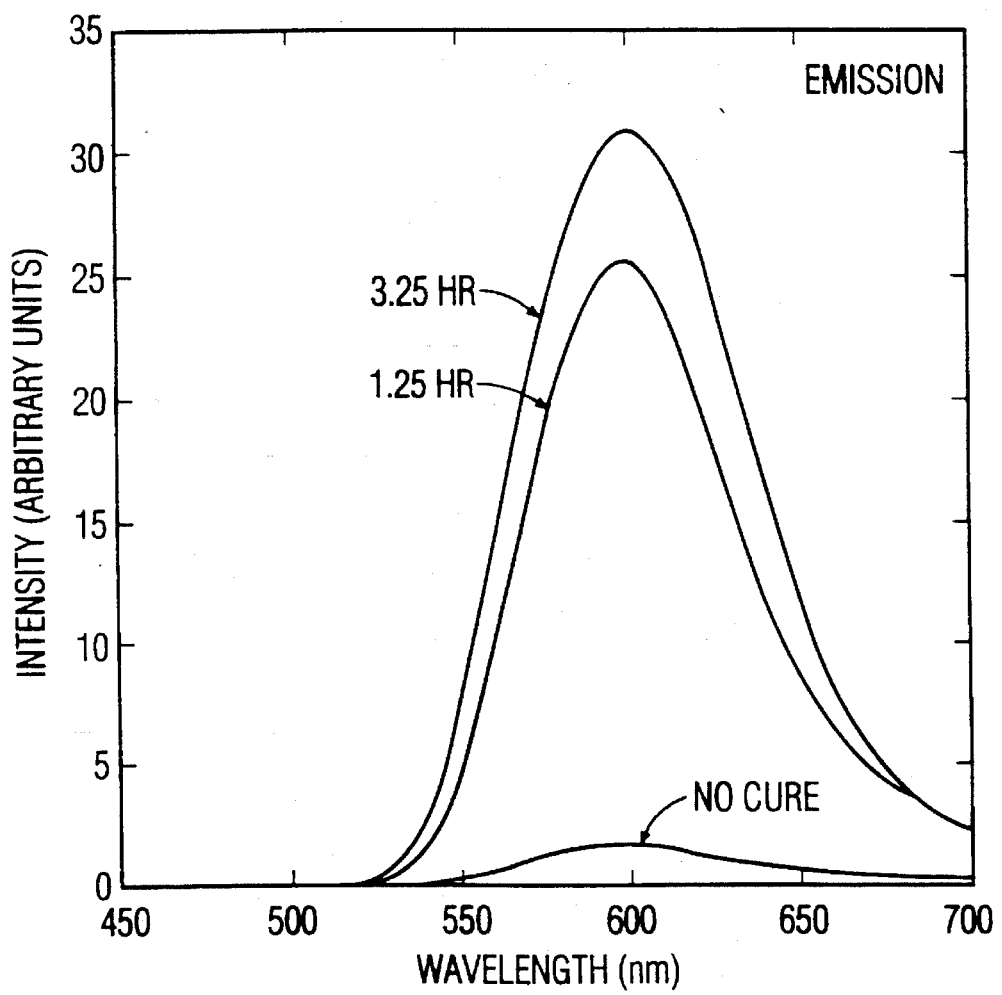
FIG. 2 is a chart showing the effect of UV curing on the luminescence of the nanoparticles.

Another unique characteristic of this material is the effect of the surfactant, and the ultraviolet curing of the surfactant, on the light emission. The brightness was visibly improved when the precipitated particles were exposed at step 36 to ultraviolet light (300 nm) over several minutes. FIG. 2 demonstrates that after exposure the intensity of the orange emission improves when all other experimental conditions are kept the same. The samples show a decreased rate of improvement with time. Bulk ZnS:Mn samples were similarly tested after coating with the same surfactant in toluene, settling and drying. In contrast, the luminescent intensity of the bulk ZnS:Mn decreases with exposure time.

These characteristics were also observed on samples in which ZnS quantum sized particles were doped with manganese and using methacrylic acid ($H_2C=C(CH_3)COOH$, CAS no. [79-41-4]) as the surfactant rather than poly(methyl methacrylate) polymer, and these characteristics have since been demonstrated in earlier samples of both medium (145,000) and low (12,000) molecular weight poly(methyl methacrylate).

The cause of UV curing and why it is different in bulk and nanometer sized particles is not well understood. The ultraviolet curing of the surfactant may cause physical changes such as polymerization of the monomer, increased crosslinking in the polymer, which results in passivation of terminal chemical sites on the particles. Normal expectations are that the increased molecular mass upon curing leads to increase surfactant absorbance and a decrease in light emission as seen in the bulk ZnS:Mn powder. It is believed that UV curing is providing surface passivation of the nanocrystals through photopolymerization. The increase in light emission is probably related to decrease of the surface related non-radiative processes. It may be possible to replicate this effect by another surfactant or a purely chemical treatment.

The nanoparticles produced by the methodology comprise doped semiconductor particles of from 20–100 Å in size with a coating of surfactant. The thickness of the coating depends on the physical characteristics of the surfactant used, methacrylic acid will provide the thinnest coating ($\cong 10$ Å) with PMMA coatings thicker depending on the type used (>10 Å). The particles are doped with approximately 0.5–1.0% of dopant. A comparison of the properties of the nanocrystalline particles of the nanocrystals with bulk (non quantum sized) doped semiconductor powder is as follows:

| Mn doped ZnS | Processing temperature | Mn-concentration | External Quantum Efficiency | Recombination Decay time |
|---|---|---|---|---|
| Nanocrys. | Room temp. | 0.5–1.0% | 10% | 3 nsec. |
| Bulk | 1100 C. | 1.0–2.0% | <20% | 1.7 msec. |

Firstly, it is seen that the doped nanocrystals have an efficiency comparable to the bulk, yet they have been processed at room temperature while the bulk samples are annealed at temperatures >1000° C. Secondly, in this size regime ($\cong 33$ Å) a large percentage of atoms in nanocrystals are surface atoms which contribute to nonradiative recombination; in spite of this, the luminescent efficiency is high in these nanocrystals. The high efficiency of the doped nanocrystals when efficiency would normally be quenched by the nonradiative surface recombination is a unique property of encapsulated doped semiconductors and is not yet completely understood.

Figure 3:
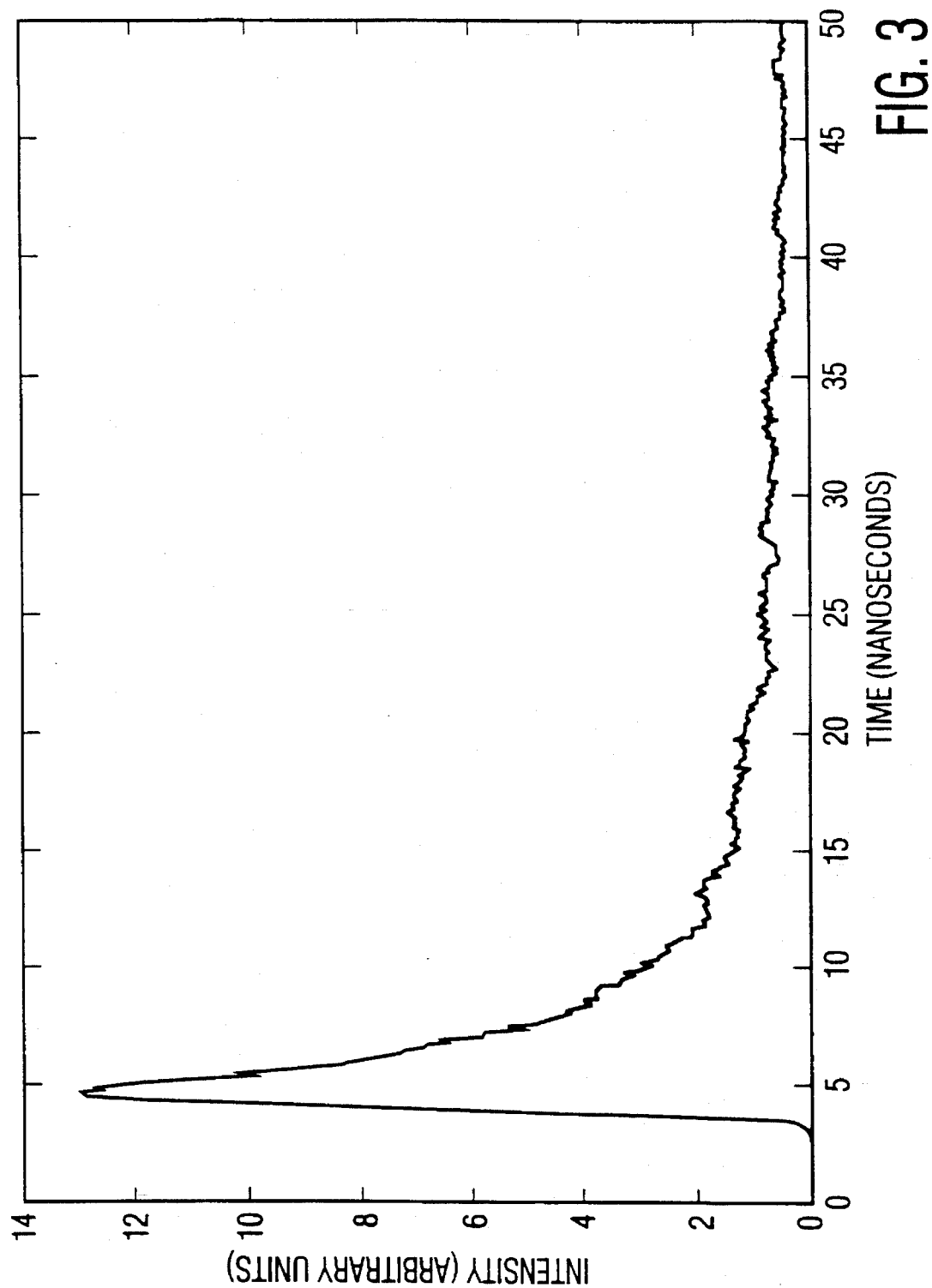
FIG. 3 is a chart of the luminescent decay time of the nanoparticles.

FIG. 3 illustrates the luminescent decay characteristics of a doped nanoparticle of the invention. In this test, the particles were illuminated by a short pulse of laser light and the light emitted with time in response is measured thereto at the characteristic wavelength of the activator element's (dopant) emission. As is seen in FIG. 3, the majority of the intensity peak is within only a few nanoseconds ($<1\times10^{-8}$ seconds). A similar response for non-quantum sized powders which are chemically identical with the nanocrystals would be approximately a millisecond ($1.7\times10^{-3}$ seconds). Put another way, the nanocrystal decay time is 10,000 to 100,000 times faster than the bulk material.

The materials described in this application can be improved by changing the starting compounds and their concentration. Samples with similar chemistries to those described when studied by transmission electron microscopy were about 65 Å in size, whereas the best produced by homogeneous precipitation have been about 33 Å and thus improvements in size reduction and enhancement of quantum confinement effects are possible. The Grignard exchange reaction to form diethylmanganese at step 28 is imprecise and may introduce unwanted residual byproducts to the solution. It has been seen in later experiments that the PMMA can be replaced by lower molecular weight polymer and even the methacrylic acid monomer whilst still retaining the quantum confinement of the surfactant. It is also apparent that other surfactants which meet the requirements stated above, may be more effective than those tried here.

In addition to the manganese doping of zinc sulfide the present process is also suitable for doping zinc sulphide with terbium, the starting component of the Grignard reaction is changed to $TbCl_3$. Additionally, other semiconductor host materials may also be prepared and doped with suitable activators. Such host materials may be zinc selinide (ZnSe), zinc telluride (ZnTe), cadmium sulfide (CdS) and cadmium selinide (CdSe) and may also be created in similar reactions. Organometallic compounds containing these elements are either readily available or can be made by Grignard or other reactions. Finally dopants such as copper, silver, thallium, cerium, chromium, titanium, rare earths and other elements may be utilized.

The organic solvent used in the reaction is Toluene. However, many other pure hydrocarbon solvents are also useable. Such suitable solvents are cyclohexane, hexane, heptane, octane and others. THF was used as the solvent in the Grignard reaction and other organic solvents may also be used. However, THF is known as being particularly effective in promoting Grignard reactions and is also soluble in with the Toluene used in the other reactions.

The above described arrangements and processing steps are merely illustrative of the principles of the present invention. Numerous modifications and adaptations thereof will be readily apparent to those skilled in the art without departing from the spirit and scope of the present invention.

What is claimed is:

1. A method of making a doped encapsulated semiconductor nanocrystal comprising the steps of:

(a) dissolving in first organic solvent an organometallic compound containing a first component of host material;

(b) dissolving a surfactant in said first organic solvent;

(c) adding an organometallic compound containing a dopant to said first organic solvent;

(d) adding a compound which will provide a second component of the host material; and (e) precipitating doped particles which are coated with the surfactant.

2. The method as claimed in claim 1 further including the step of curing under ultraviolet light the precipitated encapsulated particles.

3. The method as claimed in claim 1 wherein one of the organometallic compounds is formed by a concurrent reaction.

4. The method as claimed in claim 3 wherein the reaction to form one of the organometallic compounds comprises a Grignard reaction.

5. The method of claim 4, wherein the Grignard reaction employs a solvent soluble in said first organic solvent.

6. The method as claimed in claim 1 wherein the organometallic compound containing the dopant comprises diethylmanganese.

7. The method as claimed in claim 6 wherein said diethylmanganese is formed from the reaction of manganese chloride with ethylmagnesium chloride in a solution of THF.

8. The method of claim 6, wherein said diethylmanganese is formed from the reaction of manganese chloride with ethylmagnesium chloride in a solution comprising a solvent soluble in said first organic solvent.

9. The method of claim 6, wherein a stoichiometric excess of ethylmagnesium chloride is employed so as to drive the reaction.

10. The method as claimed in claim 1 wherein said compound containing the second component of the host material comprises hydrogen sulfide.

11. The method of claim 10, wherein said compound containing the second component of the host material comprises hydrogen sulfide solubilized in a third organic solvent.

12. The method of claim 11, wherein said third organic solvent comprises said first organic solvent.

13. The method as claimed in claim 1 wherein said surfactant comprises PMMA.

14. The method of claim 1, wherein said surfactant comprises methacrylic acid.

15. The method of claim 1, further comprising selecting a surfactant nonparticipatory in the chemical reactions associated with the precipitation of the doped particles, other than coating the particles.

16. The method of claim 15, further comprising selecting a surfactant having an ultraviolet absorption below the absorption edge of the host material.

17. The method of claim 1, further comprising selecting a surfactant having an ultraviolet absorption below the absorption edge of the host material.

18. The method as claimed in claim 1 wherein the organometallic compound containing the first component of the host material is diethylzinc.

19. A method of making a doped encapsulated semiconductor nanocrystal comprising the steps of:
   (a) dissolving in a first organic solvent an organometallic compound containing a first component of a host material; and
   (b) adding:
      (i) a surfactant;
      (ii) an organometallic compound containing a dopant; and
      (iii) a compound which will provide a second component of the host material;
whereby doped particles precipitate which are coated with the surfactant.

20. The method of claim 19, wherein, prior to said adding step, said surfactant, said compound and said added organometallic compound are dissolved in one or more respective solvents, each of which is soluble in said first organic solvent.

* * * * *